United States Patent Office 3,374,062
Patented Mar. 19, 1968

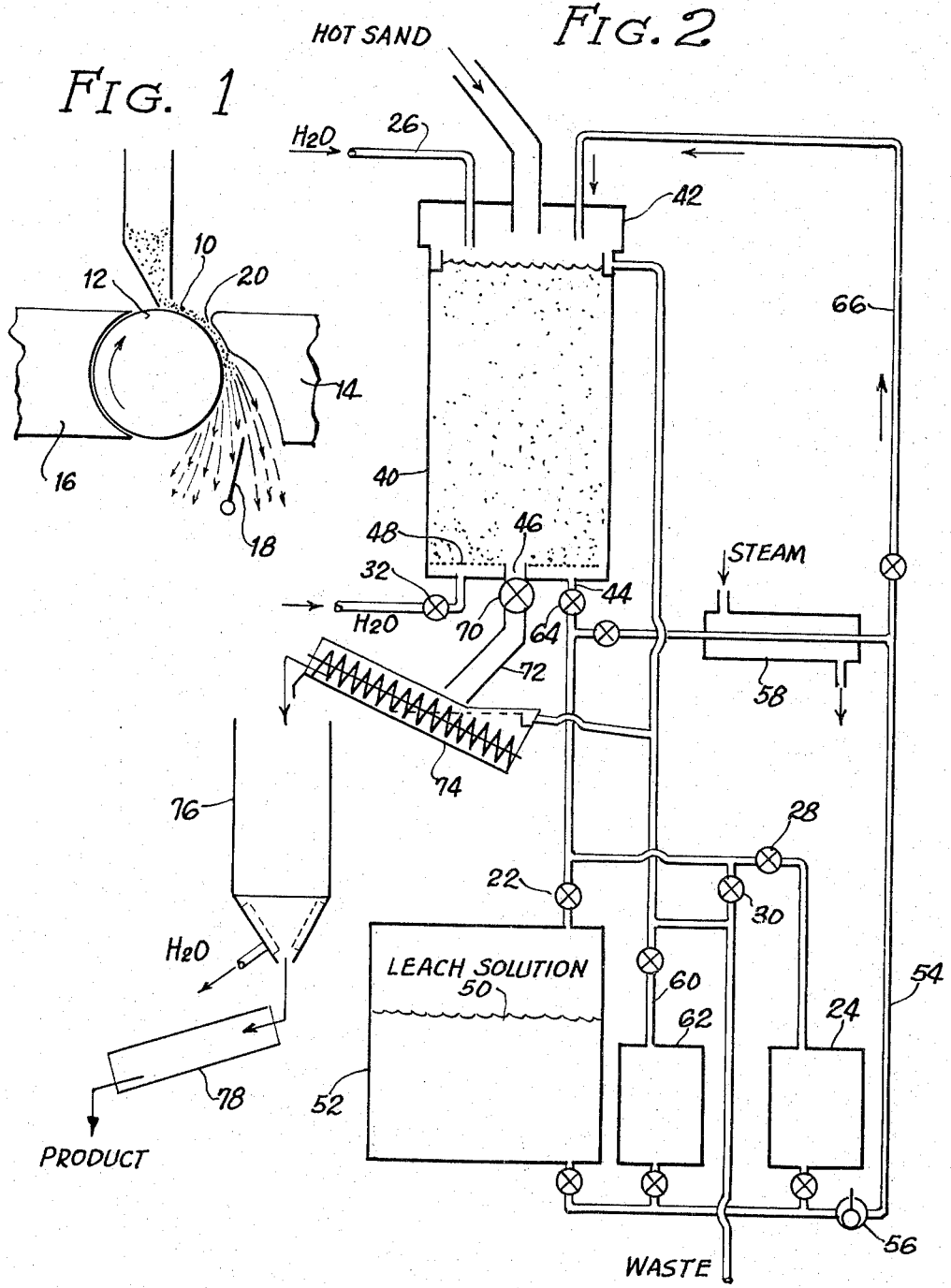

3,374,062
PROCESS FOR REFINING SANDS
Frank W. Bowdish, 2440 11th St.,
Sparks, Nev. 89431
Continuation-in-part of application Ser. No. 296,466,
July 22, 1963. This application Oct. 10, 1966, Ser.
No. 585,602
16 Claims. (Cl. 23—182)

ABSTRACT OF THE DISCLOSURE

The invention is addressed to the refinement of sand having more than 0.5% by weight iron and a substantial amount of feldspar by the combination of steps which includes a first magnetic separation for splitting the effluent from the separator into one portion having a high iron content which is discarded and a product portion in which the iron content is less than 0.15% by weight. The product portion is heated to an elevated temperature and loaded into a leaching tank to form a column therein. A leaching solution formed of an aqueous solution of sulphuric acid and alkali metal chloride is preheated to a temperature within the range of 180° to 225° F. and introduced into the tank from the bottom side at a rate sufficiently slow to enable the leaching solution to rise through the column of hot sand whereby the first portion introduced will remain at the top of the column whereby the portion of the leaching solution at the top will contain the major portion of the iron dissolved from the sand so that removal of an increment of the upper portion of the column of leaching solution will effect removal of the major portion of the iron content, the leaching solution is then allowed to drain downwardly from the tank for re-use in subsequent leaching operations while the column of sand is cleansed with wash water the initial portions of which are added to form a part of the leaching solution.

---

This is a continuation-in-part of my copending application Ser. No. 296,466, filed July 22, 1963, and entitled, "Process for Refining Sand."

This invention relates to a process for refining sand and it relates more particularly to the refinement of sand for use in the preparation of glass and ceramics wherein the presence of feldspar is a desirable cost factor but in which the presence of iron is undesirable because of its effect in discoloring the glass. Thus this invention is addressed more particularly to the refinement of sand containing substantial amounts of feldspar for the removal of iron which may be present in the form of iron particles, magnetite, ilmenite, hematite and the like. Natural sands containing quartz and feldspar also usually contain some iron or iron-bearing materials which make the sand unsuitable for use in glass or ceramics without treatment to remove iron-bearing components but without corresponding removal of quartz or feldspar or other desirable components.

Thus it is an object of this invention to provide a method and means for the treatment of sand to effect substantial reduction in iron content to a level below that which will have any undesirable effect on the use of the sand in the manufacture of glass or ceramics. More particularly, it is an object of this invention to provide a manufacturing process for the refinement of sand to effect removal of iron without corresponding removal of other of the desirable minerals present in the sand, such as quartz, feldspar and the like; in which the process can be carried out in a simple and efficient manner, in which the process can be carried out in large scale operations, using commercially available equipment and a minimum amount of labor and materials; and in which a high yield of low iron content sand is produced at minimum cost.

These and other objects of this invention will hereinafter appear and for purposes of illustration, but not of limitation, an embodiment of the invention is shown in the accompanying drawing, in which—

FIG. 1 is a schematic view in section of the arrangement of elements for magnetic separation, and FIG. 2 is a diagrammatic sketch of equipment arranged to show the flow of materials for effecting the leaching operation.

Some natural sand deposits consist of fragments of the more resistant minerals contained in the parent rock from which the sand was derived. From such deposits much of the softer and weathered material such as clay and mud has either been washed away by natural streams or may be removed by washing to leave sand particles that are sound. Such material is often washed and sized to produce sand for construction and other purposes. Fine sand from such operations is generally either discarded or used for fill material, in asphalt paving mixtures, or for other purposes where it has a very low unit value. In locations where the composition of the sand is suitable, either the fine sand usually rejected from the construction sand or some coarser fractions of sand can be treated by the novel process disclosed herein to yield a mixture of minerals than can be substituted for at least part of the mineral concentrates otherwise required in the manufacture of ceramics and glass.

Rocks containing feldspar or minerals that may be substituted for feldspar and/or quartz together with other minerals may also be treated by the process disclosed herein by first crushing and grinding the rocks to produce an artificial sand for treatment by the process. Unless otherwise specified, the word "sand" as used hereinafter shall be understood to mean a particulate material whether is occurs naturally or is obtained by comminution of coarser sand or gravel or solid rock.

The sands to which this invention may be applied commonly contain substantial fractions of quartz and/or feldspar minerals together with minor quantities of other weathering and abrasion resistant minerals. These minor minerals may include iron-bearing minerals such as magnetite, ilmenite, biotite, hornblendes, and other accessory minerals contained in the rocks from which the sand was derived. Magnetic separation, gravity separation, or flotation may often be used to remove part of the iron content of the sand in the form of these iron-bearing minerals. Only in exceptional cases, however, will such treatment alone produce a feldspar-quartz product sufficiently low in iron to permit its substitution for the mineral concentrates normally used in glass and ceramics.

This invention will hereinafter be described with reference to the refinement of sand which contains substantial amounts, such as up to 25% by weight or more of feldspar. The latter is a desirable component in compositions used to make glass and ceramics and it constitutes an expensive raw material. Thus sands containing substantial amounts of feldspar have sufficient value to make is economically feasible to invest substantially in the refinement of the sand to effect the removal of undesirable ingredients and it is desirable to effect such refinement for the removal of iron which is usually present in sands containing substantial amounts of feldspar.

While the invention has particular application to the refinement of sand having a high feldspar content, it will be understood that the concepts of the invention may be employed in the treatment of sand for the removal of iron where feldspar is not present or present only in minor amounts.

Experiments with many quartz-feldspar sands have shown that the mixed mineral product obtained after the most intense magnetic separation, gravity separation, or flotation of iron-bearing materials, still contains too much iron for use in glass or ceramic manufacture. Feldspar concentrates made from such sands by flotation also contain excessive amounts of iron, only part of which can be removed by magnetic, gravity, flotation, or scrubbing procedures. Other experiments have shown that prolonged treatment with hot acids is also incapable of producing a suitable low-iron product for manufacture of clear substantially colorless glass.

The process disclosed herein resulted from a study of the reasons for the failure of the experiments mentioned above. Iron occurs in several forms in the sand mixtures of minerals to which this invention may be applied. A substantial part, often a major part, of the iron in such sands occurs as grains of iron-bearing minerals which are highly resistant to dissolution in acids. For this reason acid treatment alone of the sands will not lower their iron content sufficiently to make them usable for glass, ceramic, or chemical manufacturing.

Iron also occurs as a part of the sand particles remaining behind after flotation, magnetic separation, or gravity separation of the iron-bearing minerals. At least part of the iron that may not be removed magnetically, by gravity or by flotation must be on the surface of the particles because abrasive scrubbing will remove part of it. This is especially true of natural sands that have had their surfaces exposed to weathering and iron-bearing solutions for a very long time. However, even abrasive scrubbing used in combination with the other mechanical processes mentioned will not usually result in sufficient iron removal. Very long exposure of natural sand particles, and especially particles of feldspar, to the weathering influence of air and water with naturally dissolved salts seems to have created cracks in or pits on the surface of the mineral particles within which iron compounds have been deposited. Small amounts of such iron impregnation in a mineral particle will not make it respond to any of the methods for removing iron-bearing mineral particles, nor can it be removed by abrasive scubbing of the surface of the particle.

The invention will now be described with reference to the procedures and equipment for the refinement, using a waste sand discarded as unsuitable for use in the mixing of concrete but which can have considerable value as a glass sand because of its high content of feldspar (about 25% by weight) but which is currently unsuitable for use as glass sand because of its relatively high iron content, often higher than 1% by weight of iron. It will be understood that other sources of sand can be used, such as river bottom sand, coarse sand, dune sand and the like.

For use in the practice of this invention it is preferred to make use of a fine sand such as a sand having a mesh size passing through a 28 Tyler screen or US-30. In the event that raw material constitutes a coarse sand, it is desirable to grind the sand to the finer mesh size desired for use in the practice of this invention.

Example 1.—Magnetic separation

Referring to FIG. 1 of the drawing, a dry sand 10 is cascaded over the periphery of a rotating magnetic roll 12 located between pole pieces 14 and 16 connected to a suitable electrical source. The sand 10 falls from the periphery of the magnetic roll with a spread or angle depending upon the magnetic attraction between the sand particles and the magnetic roller whereby the sand particles most highly attracted by reason of the presence of magnetic iron are displaced inwardly from the normal path of travel of the non-magnetic material which is relatively unattracted by the magnetic roller.

A splitter 18 is adjustably located in the path of the sand particles falling from the roller to split the stream into an inner portion which is formed of the sand particles containing the more magnetic components and an outer portion formed of the sand particles having little, if any, magnetic attraction for the roller. Thus the splitter 18 can be set to cut the stream at any desirable fraction. The more highly magnetic portion cut from the main stream by the splitter is usually discarded as unsuitable for subsequent treatment.

It has been found that it is desirable to effect removal not only of the strongly magnetic sand particles but also of the slightly magnetic particles in order to provide a product suitable for the subsequent leaching of the sand to remove iron in amounts sufficient to reduce the iron to a level low enough for use as a glass or ceramic sand.

When the pole piece 14 is spaced a substantial distance from the periphery of the magnetic roller 12 to provide a substantial gap 20 therebetween, 30–50% of the sand can be split from the stream to leave only 50–70% of the sand for the subsequent leaching. Even this relatively small percentage of sand is incapable of yielding a product having a sufficiently low iron content because of the excessive amounts of iron which still remain in the sand after magnetic separation. Splitting to remove a still higher percentage of sand by magnetic separation to yield a product having a correspondingly lower iron content for use in the subsequent leach is undesirable from the economical standpoint because of the large amount of material required to be processed to secure a relatively low amount of sand having a sufficiently low iron content when processed in this manner.

It has been found that by modification to achieve a higher intensity field in the magnetic separation such as by spacing the pole piece 14 more closely to the periphery of the magnetic roller to reduce the gap through which the stream of sand travels, it is possible to effect dry separation in air with the splitter set to remove only 25% of the flow for discard while yielding a product suitable for further refinement by the chemical leach. It has been found that an iron content of 0.15% by weight is the maximum that can be permitted in the feed from the magnetic separator to the chemical leach for removal of sufficient iron by the subsequent leach step to enable use of the sand in the manufacture of glass or ceramics. The sand split from the stream issuing from the periphery of the magnetic separator contains iron in forms and in locations which often cannot be leached by the chemical leach, such as inclusions within the crystal structure.

By way of illustration, but not by way of limitation, the desired separation to yield a sand having less than 0.15% by weight of iron can be effected with a magnetic roller having the pole piece 14 spaced about ⅛ inch from the periphery of the roller with the coil of the magnet having a current density sufficient to develop a magnetic circuit that is fully saturated with 90,000 to 120,000 lines of force per square inch across the space between the pole pieces and the periphery of the roller. Under these conditions, feed having an original iron content of 1% or more yields a product which averages about 0.13 to 0.15% by weight of iron in which the product constitutes 75% by weight of the original feed.

In practice, use has been made of a five-high roll magnetic separator in which the pole pieces are set at different distances from the periphery of the roller with the maximum gap at the top and with the minimum gap at the bottom with the sand particles cascaded over the rollers with the unsplit portion from the upper roll constituting the feed to the next lower roll. By this arrangement, the iron and magnetic material will be removed mostly by the top roller whereby the feed to the lower rollers will constitute the lesser magnetic materials in the form of locked particles of magnetic material such as hematite with little, if any, magnetite.

Example 2.—Chemical leach

The non-magnetic sand particles from the magnetic separator are next subjected to a chemical leach with an acidic solution at elevated temperature.

For this purpose, the sand is preheated to elevated temperature, preferably to a temperature within the range of 180° to 225° F. and more preferably to a temperature within the range of 200° to 225° F. While it is possible to carry out the chemical leach without preheating of the sand, the time required to effect removal of the desired amount of iron may take many months in the absence of leaching at elevated temperature such that leaching without preheat would be impractical. Preheating to a temperature below 180° F. will reduce the time required for leaching but the circulation of excessive amounts of hot chemical leach solution would be required to achieve the temperature conditions desired for optimum results from the leaching operation. Heating of the sand to a temperature in excess of 225° F. or above the boiling point of the leaching solution will result in undesirable boiling of the solution upon contact with the sand and the loss of volatiles to the atmosphere whereby an unstable process and unhealthy atmosphere may result.

While the temperature of the sand can be raised to the desired level by the chemical leaching solution when heated to a temperature higher than that desired for the leaching operation, the time required for raising the sand to the desired temperature would be increased and an unstable system would result from the excessive heating of the leaching solution. In the preferred practice of this invention, the sand is preheated in a rotary kiln preferably to a temperature sufficiently above the temperature desired for the chemical leaching operation to compensate for heat losses incurred during transfer of the sand to the leach tank so that, when the sand is loaded into the tank, the mass will be at a temperature within the range of 180° to 225° F. Thus the sand may be heated in the kiln to a temperature up to about 260° F.

The hot sand is leached with an acidic solution containing an alkali metal halide such as a sulphuric acid solution containing sodium chloride, potassium chloride and the like alkali metal chloride dissolved therein. Any halide of a metal which would not cause sulfate precipitation can be used, such as ammonium chloride, magnesium chloride and the like.

In the preferred practice of this invention, the aqueous leaching solution is formulated to contain 10–20% by weight of $H_2SO_4$ and 3–15% by weight of an alkali metal chloride, and preferably 10–15% by weight $H_2SO_4$ and 6–10% by weight alkali metal chloride. While use can be made of an acid such as sulphuric acid, in the absence of the metal halide, the presence of the latter in solution operates effectively to accelerate the rate of leaching two to five fold whereby inclusion of the metal halide in the chemical leaching solution is most desirable. While the use of an acid such as hydrochloric acid alone may result in rapid leaching, the reagent cost is several times as great and the high volatility of hydrogen chloride in such solutions makes the use of hydrochloric acid undesirable. The combination of sulphuric acid and sodium chloride results in rapid leaching, low reagent costs, and a relatively low level of obnoxious fumes.

In practice, the chemical leach makes use of the system illustrated in FIG. 2 in which the hot sand 10 is loaded into a leaching tank 40 which is provided with a cover 42 at the top and with an inlet 44 at the bottom through which the leaching solution flows into and out of the tank and a larger outlet 46 at the bottom through which the refined sand is flushed from the tank. Spaced a short distance from the bottom of the tank is a filter plate or fabric 48 formed of a material such as polypropylene which is resistant to the acidic leaching solution. The tank walls are preferably lined with a material to protect the metal walls from corrosion by the solution, such as a lining of "Hypalon" rubber, marketed by E. I. du Pont de Nemours & Company.

A leach solution 50 formulated of 100 parts by weight water, 18 parts by weight concentrated sulphuric acid and 10 parts by weight sodium chloride is stored in a separate storage vessel 52. The latter is connected with the inlet 44 through a line 54 having a pump 56 for the displacement of liquid from the storage vessel 52 into the tank 40. The line is also provided with a heat exchanger 58 through which the stream flows for heat exchange relation with a heating fluid to raise the temperature of the aqueous leaching solution to leaching temperature within the range of 180° to 225° F. before introduction into the leaching tank 40. The heat exchanger 58 can be of conventional construction, such as a shell having a plurality of tubular elements extending therethrough with the heat exchange fluid constituting low pressure steam at about 240° to 250° F.

The leaching solution, preferably heated to a temperature of 200° to 225° F., is injected into the tank through the inlet 44 into the area beneath the filter plate 48 so that it will rise gradually through the column of sand loaded within the tank to wet the sand particles and effect removal of soluble iron therefrom.

The leaching solution is injected into the leaching tank at a slow rate to permit unidirectional flow with a minimum of intermixing within the tank so that the liquid which first enters the tank will remain at the top of the column of liquid introduced into the tank while the liquid last to be introduced will remain at the bottom.

It has been determined that the major portion (50% or more) of the iron remaining in the sand loaded into the tank will be removed by the leaching solution within the first 5–10 minutes of contact. Thus, for example, if the leaching solution is introduced at a rate to overflow the column of sand in 100 minutes, then all of the sand will have been in contact with the first $1/10$ of the leaching solution introduced into the tank for at least 10 minutes. Thus some 50% of the residual iron on the sand will find its way into the solution forming the upper $1/20$ to $1/10$ of the column of liquid in the leaching tank.

The introduction of leaching solution is continued at the same slow rate in amounts to overflow the top of the tank with the upper $1/10$ of the column of solution which contains the majority of the iron leached from the sand. This first increment that is overflowed will carry most of the iron remaining in the sand to waste. In the preferred practice, introduction of leaching solution is continued to overflow a second increment, such as the $1/10$ of the column immediately following the upper increment discarded to waste. This second increment containing greater proportions of iron than the remainder of the solution in the tank is overflowed through line 60 for collection in an intermediate storage tank 62 for use as the initial increment of leaching solution introduced into the tank to constitute the upper $1/10$ of the column in the next cycle of leaching operation.

After the first increment of leaching solution has been overflowed to waste and the second increment overflowed to storage, the remainder of the leaching solution is retained at rest in the leaching tank for an additional soaking time, such as 5–15 or more hours. In the illustrated modification, the tank is 8 feet in diameter and has a capacity of about 3000 gallons of liquid when filled with sand. Thus the first increment which is overflowed to waste will amount to about 300 gallons of leaching solution while the next 300 gallons will be overflowed to the intermediate storage 62. The large amount of material filling the tank enables the tank to hold the heat for a substantial period of time to achieve the desired soak and leaching action during the holding period.

Removal of the leaching solution is effected by opening slightly valves 64 and 22 to enable the solution to drain slowly by gravity from the bottom of the tank. As the solution is drawn down in the tank for return to the storage facility 52, wash solution is drawn from tank 24 and pumped by pump 56 through lines 54 and 66 onto the top of the sand column at substantially the same rate as the leach solution is withdrawn thereby keeping the sand column covered at all times. After the wash solution from tank 24 has soaked into the top of the sand column following the leach solution as it drains down, but without permitting any air to be entrapped within the sand bed, a large quantity of wash water from inlet 26 is added to keep the sand covered with water while the leaching solution is drained rapidly into storage tank 52. Even through valves 64 and 22 are opened fully for this drainage, very little intermixing occurs between the layers of solution in the sand column, and about 90% of the leaching solution may be recovered without any dilution. The layer of wash solution from tank 24 following the top of the leach solution down through the sand column becomes enriched in acid and salt and dissolved iron washed from the sand, and most of this enriched wash solution is also drained into tank 52 in order that the acid and salt it contains may be reused, and further to provide water for making up the leaching solution to its original volume and composition for the next leaching cycle. The first increment of wash water overlying the wash solution layer is drained through valve 28 into tank 24 by closing valve 22, and the remainder of the wash water is drained to waste through valve 30. The first increment of wash water will contain most of the leaching solution left entrained on the particles of sand after passage of the wash solution thereby to enable recovery of most of the leaching solution. Any acid or salt remaining in the column of sand will be washed from the sand by the additional increments of wash water flowing downwardly therethrough.

After the leach solution has been drained from the tank and the sand washed with water to remove residual acids, the main valve 70 is opened and water is introduced through valve 32 into the tank in relatively high volume beneath the filter whereby the water flows upwardly through the filter into engagement with the leached sand to wash the sand from the tank through the passage 72. The sand which is washed from the tank is led to a screw washer 74 which drains and lifts the solids particles of sand to a bin 76 for further drainage after which the sand is dried in a conventional kiln drier 78 to yield a product having about 0.03% by weight residual iron thereby to provide a product which is well adapted for use in the production of glass and ceramics.

The foregoing process is well adapted for use in the treatment of sand having substantial amounts of limestone or calcium carbonate which dissolves in the acidic leaching solution during removal of the residual iron. It has been found that the dissolved calcium slowly forms into calcium sulphate which precipitates probably in the form of gypsum. In the absence of the removal of the first increment of solution which comes into contact with the sand, as previously described, the formed calcium sulphate crystals interefere with the free flow of liquid into and out of the tank and they also block the pipe lines and foul the heat exchanger tubes. When, as described, the leaching solution is caused to rise slowly through the column of sand, the calcium, which is dissolved in the first increment, will be carried from the system with the first increment of liquid that rises to the top and is discarded.

As used herein and in the claims, the term "iron" is intended to include not only elemental iron but iron in its various combined forms.

It will be apparent from the foregoing that I have provided an efficient mass production process which is capable of utilization of valuable sands containing substantial amounts of feldspar to effecf removal of ingredients which are undesirable in the use of the sand in the fabrication of glass, ceramics, and other substantially colorless products.

It will be understood that changes may be made in the details of formulation and methods and conditions of operation without departing from the spirit of the invention especially as defined in the following claims.

I claim:

1. A process for refining sand for the removal of iron comprising the steps of passing the sand in finely divided form through a magnetic separator, splitting the effluent from the separator between a portion having a high iron content which is discarded and a product portion having an iron content of not more than 0.15% by weight, heat treating the product portion to an elevated temperature, loading the hot sand into a leaching tank to form a column of sand therein, preheating a chemical leaching solution and introducing the leaching solution heated to a temperature not to exceed 225° F. into the bottom portion of the tank at a rate sufficiently slow to cause the leaching solution to rise through the column of sand in the tank whereby the first portion introduced will remain at the top of the column of leaching solution rising through the column of sand in the tank whereby a major portion of the iron remaining in the sand after magnetic separation will be removed in the portion of the liquid at the top of the column, removing the increment of leaching solution at the top of the column for carrying off the dissolved iron and other soluble impurities while continuing to introduce an equivalent amount at the bottom to fill the tank with leaching solution at least to the level of the sand in the tank, holding the column of leaching solution in contact with the sand for an additional soaking time, draining the leaching solution from the tank, adding an aqueous wash at the top at a rate corresponding to the rate of drainage of the leaching solution from the tank to keep the column of sand covered while in contact with the leaching solution to prevent entrapment of air and then flushing the leached sand from the tank for removal as product.

2. The process as claimed in claim 1 in which the sand subjected to the magnetic separation step has a mesh size of less than 28 Tyler screen.

3. The process as claimed in claim 1 in which the sand subjected to refinement has more than 0.5% by weight of iron and a substantial amount of feldspar.

4. The process as claimed in claim 1 in which the magnetic separation is effected by cascading the sand as a dry stream over a rotating magnetic roller and through a gap of $3/32$ to $5/32$ inch between the periphery of the roller and the adjacent magnetic pole piece.

5. The process as claimed in claim 1 in which the preheated sand is at a temperature within the range of 180° to 225° F. in the leaching tank.

6. The process as claimed in claim 1 in which the chemical leaching solution comprises an aqueous solution of sulphuric acid and an alkali metal chloride.

7. The process as claimed in claim 6 in which the aqueous leaching solution contains 10–20% by weight $H_2SO_4$ and 3–15% by weight alkali metal chloride.

8. The process as claimed in claim 6 in which the alkali metal chloride is sodium chloride and in which the materials are present in the aqueous solution in an amount within the range of 6–10% by weight $H_2SO_4$ and 8–12% by weight sodium chloride.

9. The process as claimed in claim 1 in which the leaching reaction is carried out with the materials at a temperature within the range of 180° to 225° F.

10. The process as claimed in claim 1 in which the leaching solution is introduced at a rate corresponding to less than $1/100$ of the volume of the tank per minute.

11. The process as claimed in claim 10 in which the amount of leaching solution removed from the top of the column comprises at least the upper $1/10$ of the column to carry off the major portion of the iron dissolved out of the sand.

12. The process as claimed in claim 1 in which the leaching solution is removed from the top of the column by introduction of solution into the bottom portion of the tank to overflow the upper portion of the column from the top of the tank.

13. The process as claimed in claim 1 in which the leached sand is flushed from the tank by introducing water through the bottom portion of the tank for engagement with the underside of the column of sand within the tank.

14. The process as claimed in claim 1 which includes the additional step of drying the sand flushed from the leaching tank.

15. The process as claimed in claim 1 incdules the step of removing a second increment of leaching solution immediately below that portion of the column of leaching solution removed from the system and introducing said second increment as the first portion of leaching solution introduced into the tank in the next cycle of operation.

16. The process as claimed in claim 1 which includes the step of removing an increment of wash water immediately above the column of leach and wash solutions and introducing said removed increment as the wash solution ahead of the wash water in the next cycle of operation.

References Cited
UNITED STATES PATENTS

| | | | |
|---|---|---|---|
| 889,129 | 5/1908 | Hendryx | 75—110 |
| 1,957,579 | 5/1934 | Crew | 23—182 |
| 2,182,384 | 12/1939 | McGregor | 252—8 |
| 2,306,021 | 12/1942 | Knowles et al. | 23—182 |

FOREIGN PATENTS 482,243   3/1937   Great Britain.

OTHER REFERENCES

Perry (Editor), "Chemical Engineers Handbook," third edition (1950), pp. 1092 and 1093 relied on.

EDWARD J. MEROS, *Primary Examiner.*

OSCAR R. VERTIZ, *Examiner.*

A. GREIF, *Assistant Examiner.*